(12) United States Patent
To et al.

(10) Patent No.: US 9,524,698 B2
(45) Date of Patent: Dec. 20, 2016

(54) SYSTEM AND METHOD FOR COLLECTIVELY DISPLAYING IMAGE BY USING A PLURALITY OF MOBILE DEVICES

(71) Applicant: Aspire Event Management Limited, Hong Kong (HK)

(72) Inventors: Shiu Hung To, Hong Kong (HK); Lai Chung Chan, Hong Kong (HK)

(73) Assignee: ASPIRE EVENT MANAGEMENT LIMITED, Hong Kong (HK)

( * ) Notice: Subject to any disclaimer, the term of this patent is extended or adjusted under 35 U.S.C. 154(b) by 0 days.

(21) Appl. No.: 14/494,592

(22) Filed: Sep. 24, 2014

(65) Prior Publication Data
US 2015/0084977 A1     Mar. 26, 2015

(30) Foreign Application Priority Data
Sep. 24, 2013    (HK) .................................... 13110876

(51) Int. Cl.
  *G09G 5/12*   (2006.01)
  *G06F 3/14*   (2006.01)
  *G09G 5/02*   (2006.01)

(52) U.S. Cl.
  CPC .............. *G09G 5/12* (2013.01); *G06F 3/1446* (2013.01); *G09G 5/02* (2013.01); *G09G 2320/0626* (2013.01); *G09G 2356/00* (2013.01); *G09G 2370/022* (2013.01); *G09G 2370/16* (2013.01)

(58) Field of Classification Search
  None
  See application file for complete search history.

(56) References Cited

U.S. PATENT DOCUMENTS

| | | | | |
|---|---|---|---|---|
| 2003/0017823 | A1* | 1/2003 | Mager | H04M 1/22 455/414.1 |
| 2012/0075330 | A1* | 3/2012 | Klassen | G06T 11/001 345/593 |
| 2013/0027431 | A1 | 1/2013 | Chu | |
| 2013/0109364 | A1* | 5/2013 | Mercuri | H04M 3/42 455/414.2 |
| 2014/0237043 | A1* | 8/2014 | Walsh | H04L 65/403 709/204 |

OTHER PUBLICATIONS

Search Report of Hong Kong Short-term Patent Application No. 13110876.3 issued on Oct. 25, 2013.

* cited by examiner

*Primary Examiner* — Said Broome
*Assistant Examiner* — Vu Nguyen

(57) ABSTRACT

An image display system includes a network server. The network server is configured to operate with a plurality of mobile devices and is configured to split a predetermined image into a plurality of sub-images corresponding in quantity to the plurality of mobile devices and respectively transmit each of the sub-images to one of the mobile devices that occupies a predetermined display position of a predetermined display region. Each of the mobile devices is configured to correspondingly display a sub-image transmitted thereto, and the plurality of sub-images displayed by the plurality of mobile devices collectively re-compose the predetermined image. An image display method is also provided.

19 Claims, 3 Drawing Sheets

SYSTEM AND METHOD FOR COLLECTIVELY DISPLAYING IMAGE BY USING A PLURALITY OF MOBILE DEVICES

CROSS-REFERENCE TO RELATED APPLICATIONS

This application claims the benefit of Hong Kong Patent Application No. HK13110876.3 filed on Sep. 24, 2013; the contents of which is hereby incorporated by reference.

FIELD OF PATENT APPLICATION

The present application relates to image display of mobile devices, and specifically relates to an image display system and method.

BACKGROUND

Over the past few decades, information technology advances rapidly, however, little breakthrough in aspects of event productions has been achieved. Usually in large-scale events, in order to achieve on stage interactions, light sticks, whistles from the audience, etc. are generally used for rendering the atmosphere. This has certain sound and light effects, but the visual effect in rendering the atmosphere are still inadequate.

SUMMARY

The present application is directed to an image display system and method. The system includes a network server. The network server is configured to operate with a plurality of mobile devices and is configured to split a predetermined image into a plurality of sub-images corresponding in quantity to the plurality of mobile devices and respectively transmit each of the sub-images to one of the mobile devices that occupies a predetermined display position of a predetermined display region. Each of the mobile devices is configured to correspondingly display a sub-image transmitted thereto, and the plurality of sub-images displayed by the plurality of mobile devices collectively re-compose the predetermined image.

Each of the mobile devices may include a display screen. Display screens of the plurality of mobile devices may be partially or completely different.

The network server may be configured to respectively transmit a plurality of predetermined images to a plurality of predetermined display regions. The plurality of predetermined images may be partially or completely different.

The network server and the mobile devices may be connected through a wireless network or a WIFI.

The network server may include a security access module configured to authenticate access to the network server.

The network server may include a synchronization module configured to control synchronization of display of each of the mobile devices, update the splitting of the predetermined image when a number and/or a location of the mobile devices is changed, and thereafter re-send a plurality of updated sub-images correspondingly and respectively to each of the mobile devices.

The network server may include a buffer module configured to prohibit change of start time during a predetermined buffer time before the start time.

The predetermined image may be a picture or an animation.

The picture may be in a PNG, JPG or GIF format.

At least one of the sub-images may be a color group.

The network server may include a solid color processing module configured to process colors of the at least one of the sub-images; when the colors of the at least one of the sub-images are mixed, the solid color processing module processes the colors of the at least one of the sub-images into a color that has a highest proportion in the mixed colors or a lighter color of a plurality of highest proportion colors.

The present application is also directed to an image display method, including:

splitting, by a network server, a predetermined image into a plurality of sub-images corresponding in quantity to a plurality of mobile devices;

transmitting respectively, by the network server, each of the sub-images to one of the mobile devices that occupies a predetermined display position of a predetermined display region; and displaying correspondingly, by each of the mobile devices, a sub-image transmitted thereto, wherein the plurality of sub-images displayed by the plurality of mobile devices collectively re-compose the predetermined image.

The method may include displaying a plurality of predetermined images in a plurality of predetermined display regions respectively; wherein the plurality of predetermined images displayed in the plurality of predetermined display regions are partially or completely different.

The method may further include authenticating access to the network server.

The method may further include controlling synchronization of display of each of the mobile devices; updating the splitting of the predetermined image when a number and/or a location of the mobile devices is changed, and re-sending a plurality of updated sub-images correspondingly and respectively to each of the mobile devices.

The method may further include prohibiting change of start time during a predetermined buffer time before the start time.

The method may further include processing colors of the at least one of the sub-images into a color that has a highest proportion in the mixed colors or a lighter color of a plurality of highest proportion colors, when the colors of the at least one of the sub-images are mixed.

BRIEF DESCRIPTION OF THE DRAWINGS

Specific embodiment of the present application will be further described by way of an example with reference to the accompanying drawings.

DETAILED DESCRIPTION

Reference will now be made in detail to an embodiment of the image display system and method disclosed in the present application, examples of which are also provided in the following description. Exemplary embodiment of the image display system and method disclosed in the present application are described in detail, although it will be apparent to those skilled in the relevant art that some features that are not particularly important to an understanding of the image display system and method may not be shown for the sake of clarity.

Furthermore, it should be understood that the image display system and method disclosed in the present application is not limited to the precise embodiment described below and that various changes and modifications thereof may be effected by one skilled in the art without departing from the spirit or scope of the appended claims. For example, elements and/or features of different illustrative embodiments may be combined with each other and/or substituted for each other within the scope of this disclosure and appended claims.

In addition, improvements and modifications which may become apparent to persons of ordinary skill in the art after reading this disclosure, the drawings, and the appended claims are deemed within the spirit and scope of the appended claims.

It should be noted that throughout the specification and claims herein, when one element is said to be "connected" to another, this does not necessarily mean that one element is fastened, secured, or otherwise attached to another element. Instead, the term "connected" means that one element is either connected directly or indirectly to another element, or is in mechanical, electrical or electromagnetical communication with another element.

Figure 2:
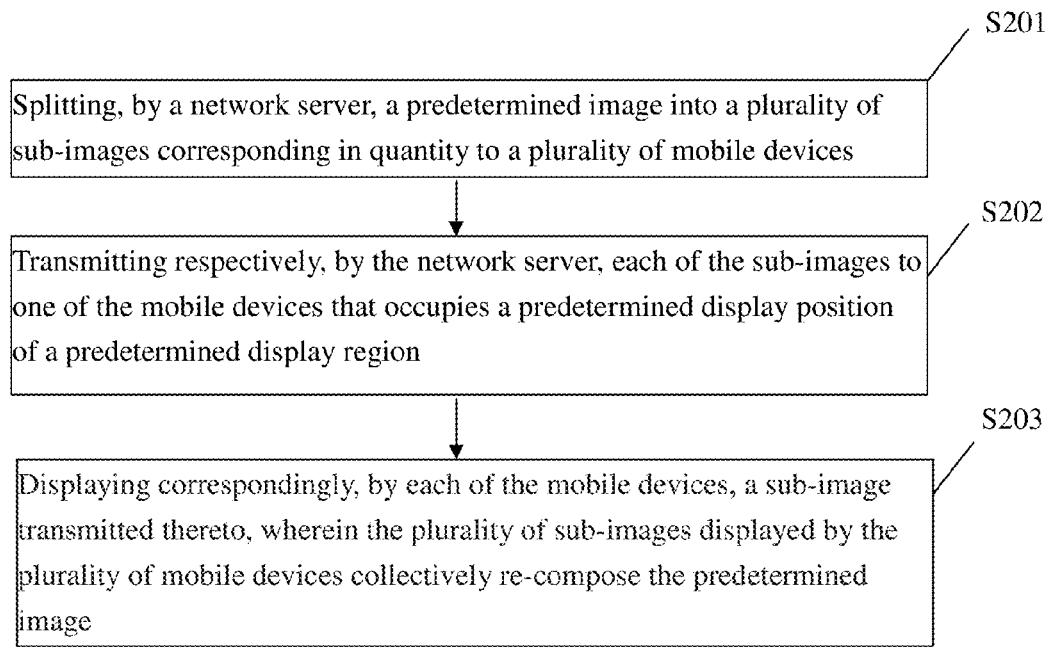
FIG. 2 is a flowchart illustrating a specific method of the embodiment of the present application.
Figure 3:
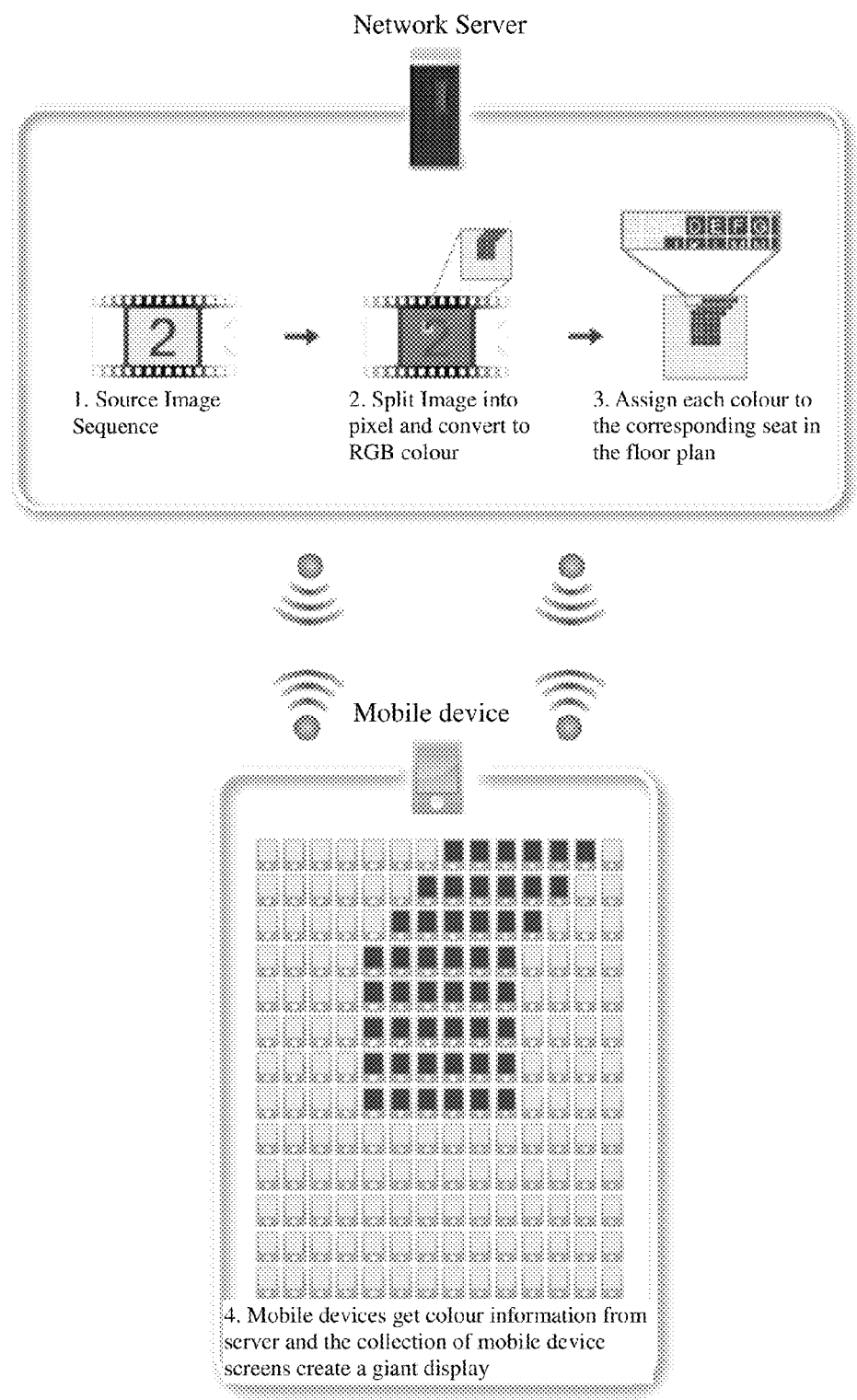
FIG. 3 is a block diagram of the embodiment of the present application.
Figure 4:
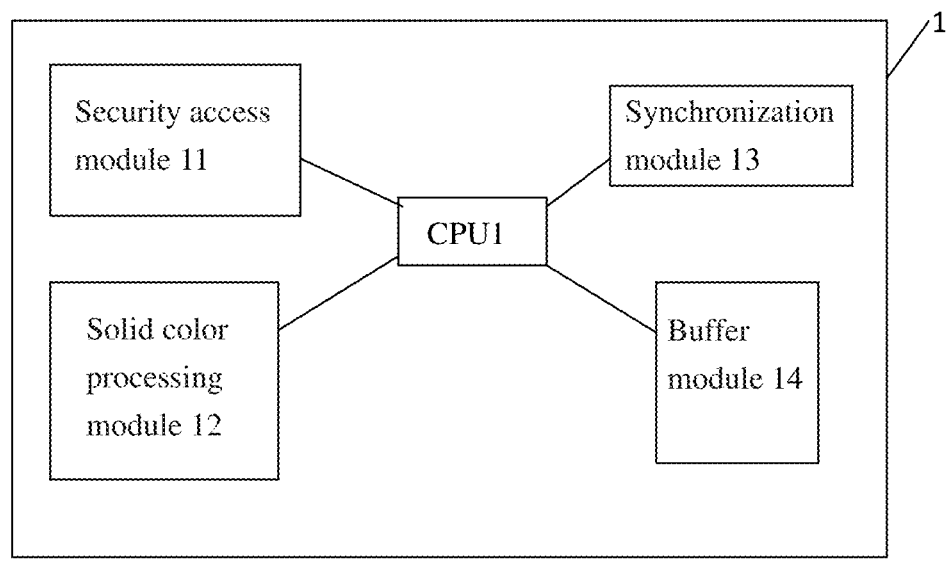
FIG. 4 is a block diagram of the network server system configuration of the embodiment.

Referring to FIGS. 1-4, FIG. 1 shows an image display system of an embodiment of the present application including a network server 1 configured to operate with a plurality of mobile devices 2. The network server, as a system management platform, is responsible for the operation management of the entire system, which may be either a single server device or a cluster constituted by a plurality of server devices. The server devices can be connected directly or through a network connection. The network server 1 also includes a local or cloud database for storing image data and related information of the mobile devices 2. FIG. 4 shows a network server with CPU10 as a system operation unit. For security consideration, the system operation unit also has a security access module 11 for security authentications such as password authentication or biological identity authentications such as fingerprint authentication, iris authentication and so on.

Figure 1:
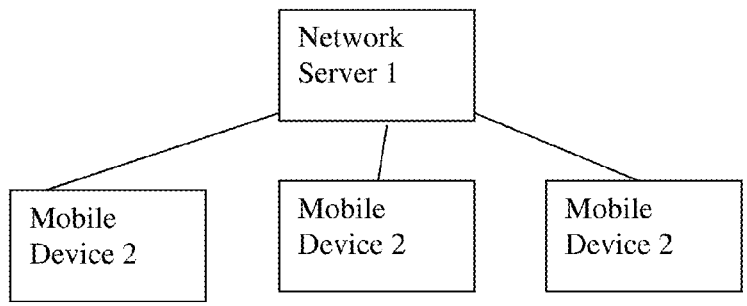
FIG. 1 is a system configuration diagram of the embodiment.

The mobile device 2 refers to the mobile device operating with system software of the image display system in the illustrated embodiment, such as smart phones and/or tablets. The smart phones and/or tablets can be any brand and model, e.g. Apple's iPhone 4s, iPhone 5, iPhone 6, iPad, Samsung's galaxy series, etc. The smart phone's and/or tablet's operating systems can be such as iOS4.x, iOS5.x, iOS6.x, Android2.x, Android4.0.x, Android4.1.x, Android4.2.x, etc. Each of the mobile devices 2 may include a display screen. The screen size of the mobile device 2 can be 4-inch, 5-inch etc. of various sizes. In short, the choice for the mobile device 2 is diverse in the present application. They may be from the same brand or they may be from a variety of coexisting brands and models. The mobile device 2 is generally in plurality. The display screens of the mobile devices may be partially or completely different. FIG. 1 only shows an example of 3 such mobile devices 2.

The network server 1 and the mobile device 2 are connected via a wireless network or WIFI. The embodiment of the present application usually requires a plurality of mobile devices 2, each operated by system software running thereon. The mobile device can take initiative to notify the network server 1 of its presence, or the network server 1 can also detect the presence of the mobile devices 2, thereby achieving interaction between network server 1 and mobile devices 2.

FIG. 3 refers to the image display system in the illustrated embodiment. The basic principle is that by way of the control of the network server 1 the image to be displayed (the source image sequence 301) is split into a plurality of sub-images 303 corresponding in quantity to the plurality of mobile devices 302 and respectively transmit each of the sub-images to one of the mobile devices that occupies a predetermined display position of a predetermined display region, that is, the sub-images are assigned to a plurality of mobile devices 302 respectively and correspondingly, each of the mobile devices is configured to correspondingly display a sub-image 303 transmitted thereto such that the plurality of sub-images displayed by the plurality of mobile devices collectively re-compose the image to be displayed thereof 304.

In the illustrated embodiment of the present application, the predetermined region where the image is re-composed is referred to as the predetermined display region. For example, in large scale stadium events, the area occupied by one entire floor of the auditorium can be considered as a predetermined display region, wherein each seat of the auditorium can then be considered as a predetermined display position of the predetermined display region. When an audience is seated in the auditorium to prepare for viewing the show events, the smart phone carried by the audience will effectively occupy the predetermined display position of the predetermined display region. Once the network server 1 has determined the existence of such a smart phone, the predetermined image to be displayed will be split into a plurality of sub-images corresponding in quantity to the number of the smart phones. As the predetermined image is predetermined for display in a predetermined display region, each sub-image will be displayed in each predetermined position of the predetermined display region. According to the corresponding relationship between each smart phone and each predetermined display position, each sub-image will be transmitted to each respective smart phone according to the corresponding relationship. Thus, based on each sub-image shown on the smart phone display a large predetermined image can be displayed in the predetermined display region. A dazzling visual effect will thereby be especially created when the smart phones held by the audiences are waved together.

The image display system of the illustrated embodiment can also be displayed on a plurality of display regions. For example, in a large stadium, the seats on the first floor can be considered as a display area; the seats on the second floor considered as another display area; seats on the third floor considered yet another display area. The display method of the above is diverse. A plurality of the display regions can display the same or different images. The image can be simultaneously displayed on multiple display regions or in turn displayed on multiple display regions. The size and shape of the plurality of display regions are not necessarily the same; each can be the same or varied.

Predetermined image can be a picture or an animation sequence such as a number sequence 1, 2, 3 as shown in FIG. 3. The methods of handling an animation and a picture are basically the same. Animation can be seen as constituted by a sequence of multiple pictures (i.e. the number 1, number 2, number 3 as three pictures) wherein animation effect is achieved through a sequence of pictures displayed at a predetermined time interval. Picture resolution may be 2560*1600, and of course can also be other resolution.

Network servers can accept batch processing of pictures, for example, bulk input of multiple images. Image format for example can be PNG, JPG or GIF and so on. A simulator can also be set up with the network server 1 for simulating the display effect of pictures or animation, so as to preview such effects.

Similar to animation sequence, a sub-image of a predetermined image can be considered as a color group (array). For example, FIG. 3 shows an enlarged sub-image wherein the sub-image is one of the sub-images of the image number "2". The sub-image, as shown in the partially enlarged view, is an array of colors, each row of points of the color array is assigned a color. The color array constitutes a sub-image, i.e. the image to be displayed, which is a part of the image number "2". The network server 1 has a solid color processing module 12, which can process colors of the sub-image to a solid color. Generally the color that has the highest percentage in the color array will be the color of the solid color after processing. For example, if the color of the color array is 20% white and 80% black, the color of the color array can be processed as black. If the proportions are equal such as 50% white and 50% black then the selection will be pale, i.e., the processed color is white. Color can be defined in RGB format, such as HTML color code. Similarly, by arranging the order of colors as well as the duration of each color, the animation sequence of the sub-images can be displayed as a color sequence.

FIG. 2 shows the image display method for the image display system of the illustrated embodiment, including:

S201) splitting, by a network server, a predetermined image into a plurality of sub-images corresponding in quantity to a plurality of mobile devices; wherein the plurality of mobile devices are configured to occupy each of the predetermined display position of the predetermined region;

S202) transmitting respectively, by the network server, each of the sub-images to one of the mobile devices that occupies a predetermined display position of the predetermined region; and S203) displaying correspondingly, by each of the mobile devices, a sub-image transmitted thereto, wherein the plurality of sub-images displayed by the plurality of mobile devices collectively re-compose the predetermined image.

Specifically, before the start of the events, when the audiences enter into the event venue such as a large stadium, audiences can be seated according to their tickets. The network server can detect the presence or absence of the smart phone for each seat by way of available seat sensor or radio signals such as smart phones responding their GPS locations according to broadcast signals. The network server thereby determines the correspondence of certain smart phone to certain seat, i.e. predetermined display position. When the network server finds the same position (seat) corresponds to a plurality of smart phones, the network server will then issue a warning signal requesting related smart phone's user checks. The smart phone users can turn on or off the image display system software to decide whether to participate in the system or not. Once participated in the system, the smart phone becomes one of the smart phones for composing the display of the large image, called the participating device. The network server will save the smart phone's original display settings, and then adjust the smart phone's display settings according to the display setting requirements tailored for the large image. For example, the display brightness can be adjusted up to the highest 100 percent and the lowest 10 percent, and the sub-image on the smart phone can be displayed as a fade-in/fade-out image and so on.

Once the participating devices are identified, the network server may split the image for display into a plurality of sub-images based on the number and location of the participating devices in the predetermined display region, so as to ensure that the plurality of sub-images is consistent in quantity with the plurality of participating devices. The image will be displayed in the predetermined display region with each of the sub-images displayed in the predetermined display position of the predetermined display region. Accordingly, the network server will transmit each of the sub-images to each of the mobile devices respectively, which correspondingly display the sub-images transmitted thereto in the predetermined display position; thereby the displays of the sub-images of all participating devices will collectively re-compose the image in the predetermined display region.

The network server also has a synchronization module 13 configured to control synchronization of the display of each mobile device. The network server can transmit data, such as data contents of sub-images to be displayed, to the participating devices at different times. However, even though the transmission of data is not necessarily synchronized, the display of the sub-images should be synchronized for the purpose that the sub-images can collectively re-compose the image. For example, say the image to be displayed is scheduled for 9:00, the network server will time synchronize all participating devices to ensure, starting at 9:00, each smartphone will display each corresponding sub-image at 9:00, so that the image to be displayed are re-composed by all sub-images simultaneously. The network server control all subsequent time synchronizations of the mobile devices during the entire image display process. Under the conditions that a certain mobile device exits the system or re-participates again later, or a new mobile device otherwise participates in the system, the network server will determine the latest change to the number and/or the location of the mobile devices participating in the system and update the splitting of the image data thereto accordingly. For example, the sub-images will be re-split to match change in position of the participating device or number of participants, and thereafter re-send the updated sub-images correspondingly and respectively to each of the participating devices, and to ensure time synchronization of the display of the image data accordingly. At the end of the image display, a uniform display of "thank you" screen or evaluation screen can also be sent to all participating devices. The network server can also keep historical records. Further, as a start time is often updated by operators due to various reasons, a corresponding buffer module 14 may be installed to provide a buffer to prohibit change of the start time 14, such as a 10 seconds buffer. For example, when the start time is 9:00, then the final time the operator can change the start time will be 8:59:50.

In summary, the image display system of the illustrated embodiment is a super large animated image composed by a large number of mobile device screens through cloud technology. The system makes use of server monitoring program, database, and smart phone application, complemented by network system, to allow unlimited number of participants to have unrestricted use of smart phone models and brands for joint participation and production of large images and animations.

In order to achieve an objective of making use of a large number of mobile devices to compose a super large screen for the display of animated images, the system splits those images of the events to be broadcasted in respect of the event content of the information database into a plurality of smaller images according to the predetermined display position, such as the seating plan of the stadium where the events are held, of the predetermined display region. The split image will be stored in the information database which after analysis and color selection will be assigned to specified location of the seating plan for usage by the smart phone application.

In using the mobile device application, users simply enter a seat number whereby the smart phone application will then be able to extract required information from the server database via Internet. Taking into account delays due to various reasons during show performances, smart phones that are already connected to the system will be continuously updated with data by the server so as to calculate accurately a start time. The smart phone screen will also be adjusted to appropriate brightness according to setting. When the event starts, all participating smart phones will each play according to procedure a sequence of images that have already been prepared based on the start time of the network server. When the smart phone applications of all participants are all running simultaneously, all participating mobile phone screens will compose into a super large smart screen for the display of unprecedented animated images.

In order to more clearly grasp and control the show effects, the server monitoring program can display real-time information (including video output during show performance and status of participating smart phones) so as for monitoring the scene and making corresponding decisions. All information of the show performances will be recorded in the database for system analyses and improvement purposes. In addition, the system uses a simulator to preview the show effect in order that various tests may be conducted before actual performance.

The image display system and method of the illustrated embodiment can be applied widely to any type of large-scale events, such as sports activities, recreational and cultural activities, corporate anniversary party, business promotion activities, concerts, international conferences, and so on.

While the image display system and method disclosed in the present application has been shown and described with particular references to a number of preferred embodiments thereof, it should be noted that various other changes or modifications may be made without departing from the scope of the appending claims.

What is claimed is:

1. An image display system comprising a network server, wherein the network server is configured to operate with a plurality of mobile devices and is configured to split a predetermined image into a plurality of sub-images corresponding in quantity to the plurality of mobile devices; the predetermined image is configured to be displayed in a predetermined display region and each of the sub-images is assigned to be displayed in a predetermined display position, occupied by one of the mobile devices, of the predetermined display region; wherein the network server detects presence of each of the mobile devices in the predetermined display position based upon at least one of signal received from a sensor located at the predetermined display position and a radio signal received from each of the mobile devices in response to a broadcasting signal of the network server; and wherein the network server is configured to respectively transmit each of the sub-images to a mobile device corresponding thereto in the predetermined display position after the detection of the presence of the mobile device at the predetermined display position; wherein the network server is further configured to control synchronization of display of each of the mobile devices, update the splitting of the predetermined image when a number and the location of the mobile devices is changed, and thereafter re-send a plurality of updated sub-images correspondingly and respectively to each of the mobile devices; each of the mobile devices is configured to correspondingly display a sub-image or an updated sub-image transmitted thereto, and the plurality of sub-images displayed by the plurality of mobile devices collectively re-compose the predetermined image.

2. A system as recited in claim 1, wherein each of the mobile devices comprises a display screen, and display screens of the plurality of mobile devices are partially or completely different.

3. A system as recited in claim 1, wherein the network server is configured to respectively transmit a plurality of predetermined images to a plurality of predetermined display regions and the plurality of predetermined images are partially or completely different.

4. A system as recited in claim 1, wherein the network server is configured to prohibit change of start time during a predetermined buffer time before the start time.

5. A system as recited in claim 1, wherein the predetermined image is a picture or an animation.

6. A system as recited in claim 5, wherein the picture is in a PNG, JPG or GIF format.

7. A system as recited in claim 1, wherein at least one of the sub-images is a color group; the network server is configured to process colors of the at least one of the sub-images; when the colors of the at least one of the sub-images are mixed, the network server processes the colors of the at least one of the sub-images into a color that has a highest proportion in the mixed colors or a lighter color of a plurality of highest proportion colors.

8. A system as recited in claim 1, wherein the network server is configured to issue a warning signal to related mobile devices when a same predetermined display position corresponds to a plurality of the mobile devices.

9. A system as recited in claim 1, wherein the network server is configured to save original display settings of the mobile devices and adjust displaying settings of the mobile devices according to display setting requirements tailored for the predetermined image.

10. A system as recited in claim 1, wherein each sub-image is in form of a color array, and wherein each row point of the color array is assigned with a color, wherein the system is further configured to:
process colors of the at least one of the sub-images into a color that has a highest proportion in the mixed colors or a lighter color of a plurality of highest proportion colors, when the colors of the at least one of the sub-images are mixed.

11. An image display method, comprising:
splitting, by a network server, a predetermined image into a plurality of sub-images corresponding in quantity to a plurality of mobile devices; the predetermined image being configured to be displayed in a predetermined display region and each of the sub-images being assigned to be displayed in a predetermined display position, occupied by one of the mobile devices, of the predetermined display region; wherein the network server detects presence of each of the mobile devices in the predetermined display position based upon at least one of signal received from a sensor located at the predetermined display position and a radio signal received from each of the mobile devices in response to a broadcasting signal of the network server;
transmitting respectively, by the network server, each of the sub-images to a mobile device corresponding thereto in the predetermined display position after the detection of the presence of the mobile device at the predetermined display position, controlling, by the network server, synchronization of display of each of the mobile devices; updating, by the network server, the splitting of the predetermined image when a number and the location of the mobile devices is changed, and thereafter re-send a plurality of updated sub-images correspondingly and respectively to each of the mobile devices; and displaying correspondingly, by each of the mobile devices, a sub-image or an updated sub-image transmitted thereto, wherein the plurality of sub-images displayed by the plurality of mobile devices collectively re-compose the predetermined image.

12. A method as recited in claim 11, comprising:
displaying a plurality of predetermined images in a plurality of predetermined display regions respectively; wherein the plurality of predetermined images displayed in the plurality of predetermined display regions are partially or completely different.

13. A method as recited in claim 11, further comprising: authenticating access to the network server.

14. A method as recited in claim 11, further comprising: prohibiting change of start time during a predetermined buffer time before the start time.

15. A method as recited in claim 11, wherein the predetermined image is a picture or an animation.

16. A method as recited in claim 15, wherein the picture is in a PNG, JPG or GIF format.

17. A method as recited in claim 11, wherein at least one of the sub-images is in form of a color array, and wherein each row point of the color array is assigned with a color, the method further comprising:

processing colors of the at least one of the sub-images into a color that has a highest proportion in the mixed colors or a lighter color of a plurality of highest proportion colors, when the colors of the at least one of the sub-images are mixed.

18. A method as recited in claim 11, further comprising:
issuing, by the network server, a warning signal to related mobile devices when a same predetermined display position corresponds to a plurality of the mobile devices.

19. A method as recited in claim 11, further comprising:
saving, by the network server, original display settings of the mobile devices; and adjusting, by the network server, displaying settings of the mobile devices according to display setting requirements tailored for the predetermined image.

* * * * *